United States Patent [19]

Knego et al.

[11] Patent Number: 4,805,560
[45] Date of Patent: Feb. 21, 1989

[54] AUTOMATIC PET FEEDING DEVICE

[76] Inventors: Frank M. Knego, 8109 Barbour Manor Dr., Louisville, Ky. 40222; Fred D. Cox, 6924 Wythe Cir., Louisville, Ky. 40059; James W. Klapheke, 2306 Village Dr., Louisville, Ky. 40205

[21] Appl. No.: 90,538

[22] Filed: Aug. 28, 1987

Related U.S. Application Data

[63] Continuation-in-part of Ser. No. 817,620, Jan. 10, 1986, abandoned.

[51] Int. Cl.⁴ ................................................. A01K 5/02
[52] U.S. Cl. .................................................. 119/51.12
[58] Field of Search .................. 119/51.11, 51.12, 51.5

[56] References Cited

U.S. PATENT DOCUMENTS

| | | | |
|---|---|---|---|
| 4,249,483 | 2/1981 | Sobky | 119/51.12 |
| 4,450,790 | 5/1984 | Stansbury, Jr. | 119/51.12 |
| 4,501,229 | 2/1985 | Williamson | 119/51.12 |
| 4,671,210 | 6/1987 | Robinson et al. | 119/51.12 |

Primary Examiner—Robert P. Swiatek
Attorney, Agent, or Firm—Charles G. Lamb

[57] ABSTRACT

An automated pet feeding device for providing food and water on an automatic, pretimed basis is disclosed. The lid and base modules are stationary and the feeding tray, supported by the motor shaft, and resting on a drive lug is indexed under the lip opening. The lip is easily detached from the base unit and the feeding tray removed without the use of tools.

9 Claims, 5 Drawing Sheets

AUTOMATIC PET FEEDING DEVICE

CROSS-REFERENCE TO RELATED APPLICATION

This patent application is a continuation-in-part of Patent Application Ser. No. 817,620, filed Jan. 10, 1986, now abandoned.

BACKGROUND OF THE INVENTION

This invention relates to an automatic pet feeding device and contains a simple, low cost method of providing food and water to small common house pets such as dogs, cats, rabbits, etc., on an automatic, pretimed basis. This invention is unique in design and solves the universal problem of pet owners wishing to leave their pets unattended for short periods of time. Research indicates that pet owners experience, on a regular basis, the dilemma of what to do with their pet when the pet owner is away from home for an extended period of time. Due to the constraints and responsibilities of pet ownership, a pet owner wishing to leave the home for more than one night is faced with the dilemma of what to do with their pet. Common solutions to the problem include (1) the pet owner boarding the pet; (2) imposing on a fried or relative; (3) paying an individual to come to the home and care for the pet; or (4) leaving large amounts of food out for the pet with the attendant problems of staleness, spoilage or vermin infestation or contamination.

A number of previous devices have been developed and are cited here. Each have notable deficiencies or limitations either in method of operation, construction, power source, serviceability, safety, or food presentation to the pet.

U.S. Pat. No. 4,248,175 to Navarro employs a driving arrangement to the feeding tray that utilizes a belt/pulley arrangement that can stretch over time, slip with age and is susceptible to breakage after long use. U.S. Pat. No. 2,528,742 to Coffing employs many intricate parts and a light bulb that must be replaced periodically. U.S. Pat. No. 3,826,231 to Crawford et al utilizes a rotating housing/lid which suffers the limitation that the device must be placed in the room in such a manner that access to the food opening does not become obstructed by furniture or other appliances. U.S. Pat. No. 4,249,483 to Sobky intended to moisten the food, subjects the food to spoilage and utilizes a coil spring for indexing purposes, but also suffers the limitation that the pet could possibly become injured if the pet is feeding at the time of actuation. U.S. Pat. No. 4,450,790 to Stansbury Jr. suffers the same limitation as the Crawford patent noted above, namely location and placement of the device is critical for reliable access from the pet.

The invention corrects the deficiencies of the above cited patents in that it is safe, simple, requires a minimum number of parts, provides separate food and water after each index below the lid opening, is automatic and thus requires no action by the pet owner. Additionally, it utilizes a relationship between the number of food/water pairs, timer on-time, and motor speed to accomplish indexing. In addition, the food tray can be simply removed without the need for tools and placed in a dishwasher without damage or alteration to the feeding device. Food and water compartment access under the lid opening is not subject to obstruction or limited because the food tray is indexed under the constantly positioned opening.

SUMMARY OF THE INVENTION

This invention, an automatic pet feeding device, discloses a modularly constructed apparatus consisting of seven major components for providing food and water to common household pets in an automatic pretimed fashion. The major components include the following: lid, food tray, base, base closure, drive lug, timer/motor mechanism, and electrical cord. This device is unique in shape and operates automatically by indexing the food tray under the lid opening. The food tray provides a plurality (six pairs shown) of food and water combinations. The food and water compartments are designed with no sharp edges and are easily accessed by the pet at the lid opening. The time/motor mechanism, located in the center of the base module indexes the food tray at, for example, 12 hour intervals. The food tray is supported by the motor shaft and drive lug and rides on top of the base module in a bearingless, beltless manner. The food tray can be removed for cleaning by first detaching the lid and then lifting it off the drive lug. The timer/motor mechanism is AC powered and operates off of standard household current via the electrical cord. The timer/motor mechanism consists of a pulse timer which activates every 12 hours for 10 seconds. This in turn controls a 1 RPM motor that operates through 60 degress and then is shut off by action of the 10 second timer. The number of food and water compartments, the timer/motor relationship eliminates the need for belts, pulleys and gear reduction to accomplish indexing.

DETAILED DESCRIPTION OF THE PREFERRED EMBODIMENT

Refer to FIGS. 1-5 and reference numbers 10-28 for an illustration of the preferred embodiment.

Figure 1:
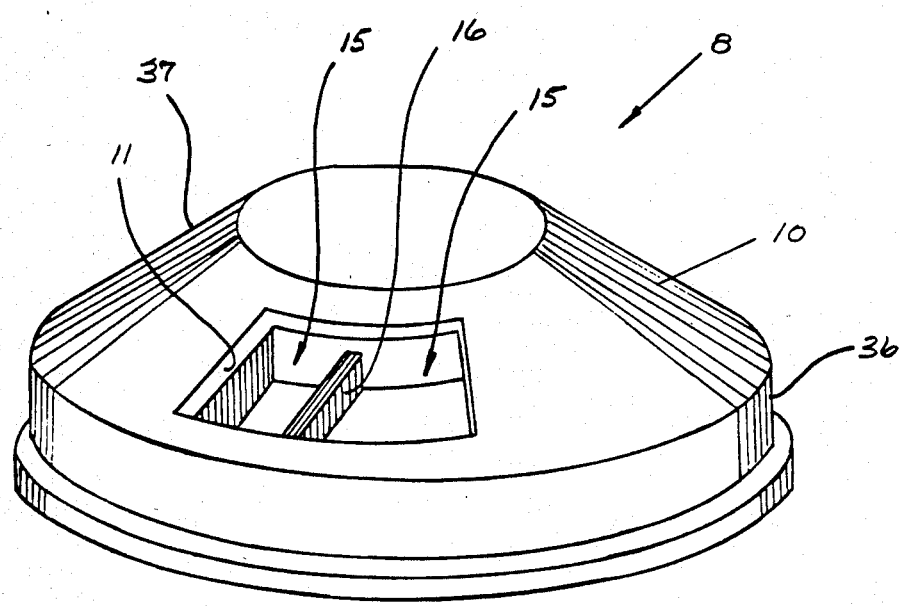
FIG. 1 is a perspective view of the preferred embodiment of an automatic pet feeding device incorporating the present invention.
Figure 2:
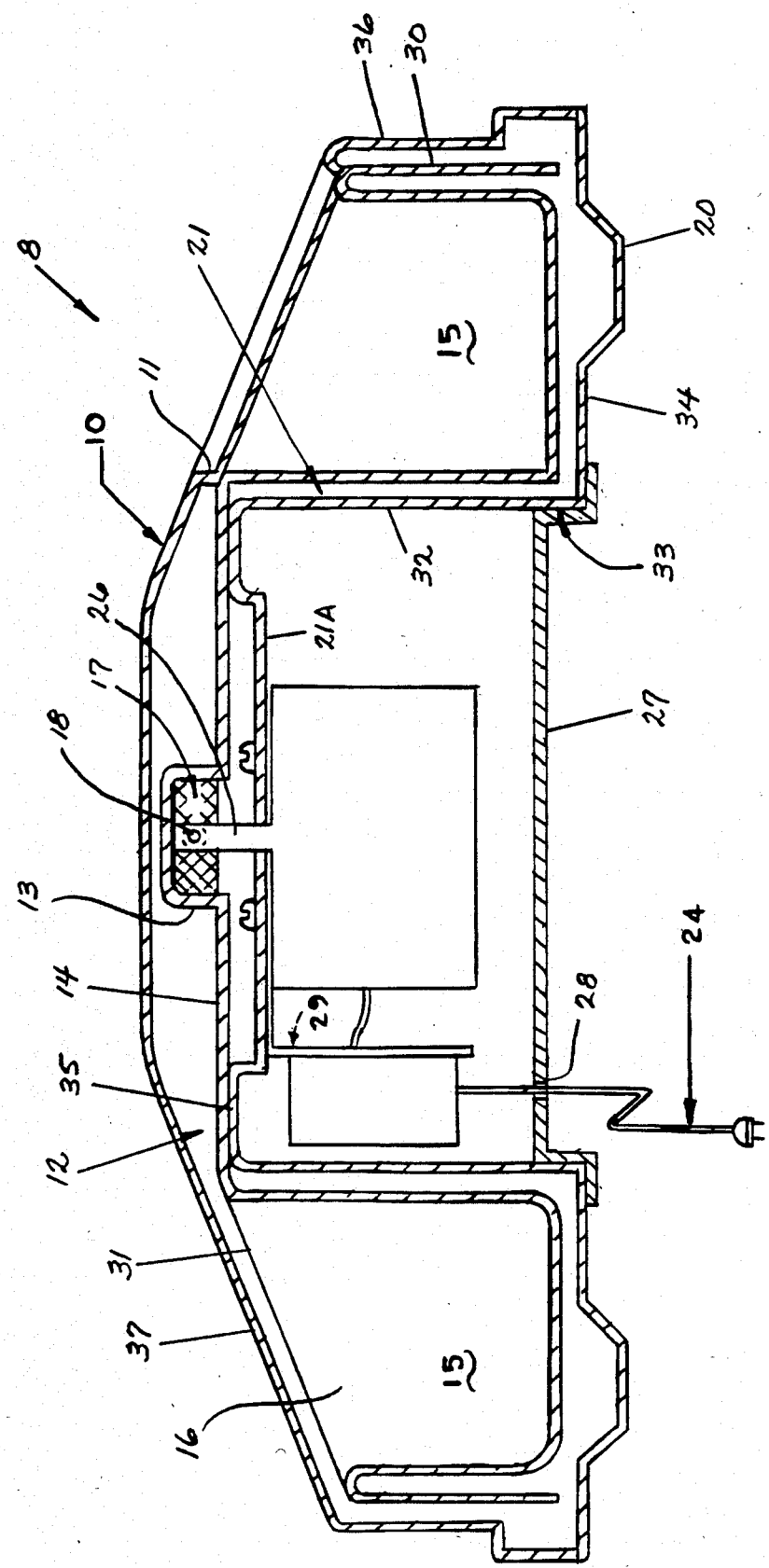
FIG. 2 is a cross sectional view of the pet feeding device of FIG. 1.
Figure 3:
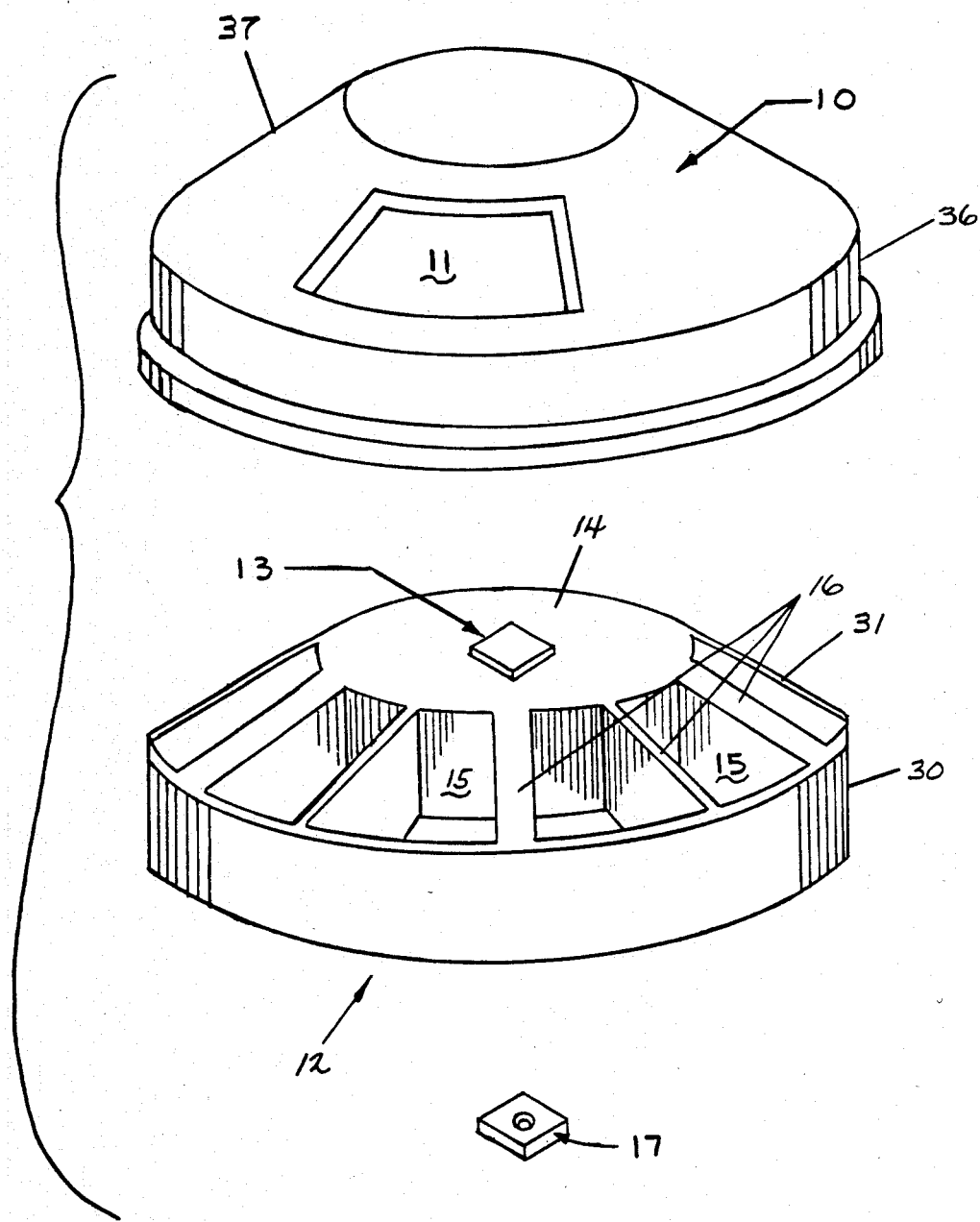
FIG. 3 is an exploded perspective view of the portion of the pet feeding device of FIG. 1 showing the relationship of the lid and food tray.
Figure 4:
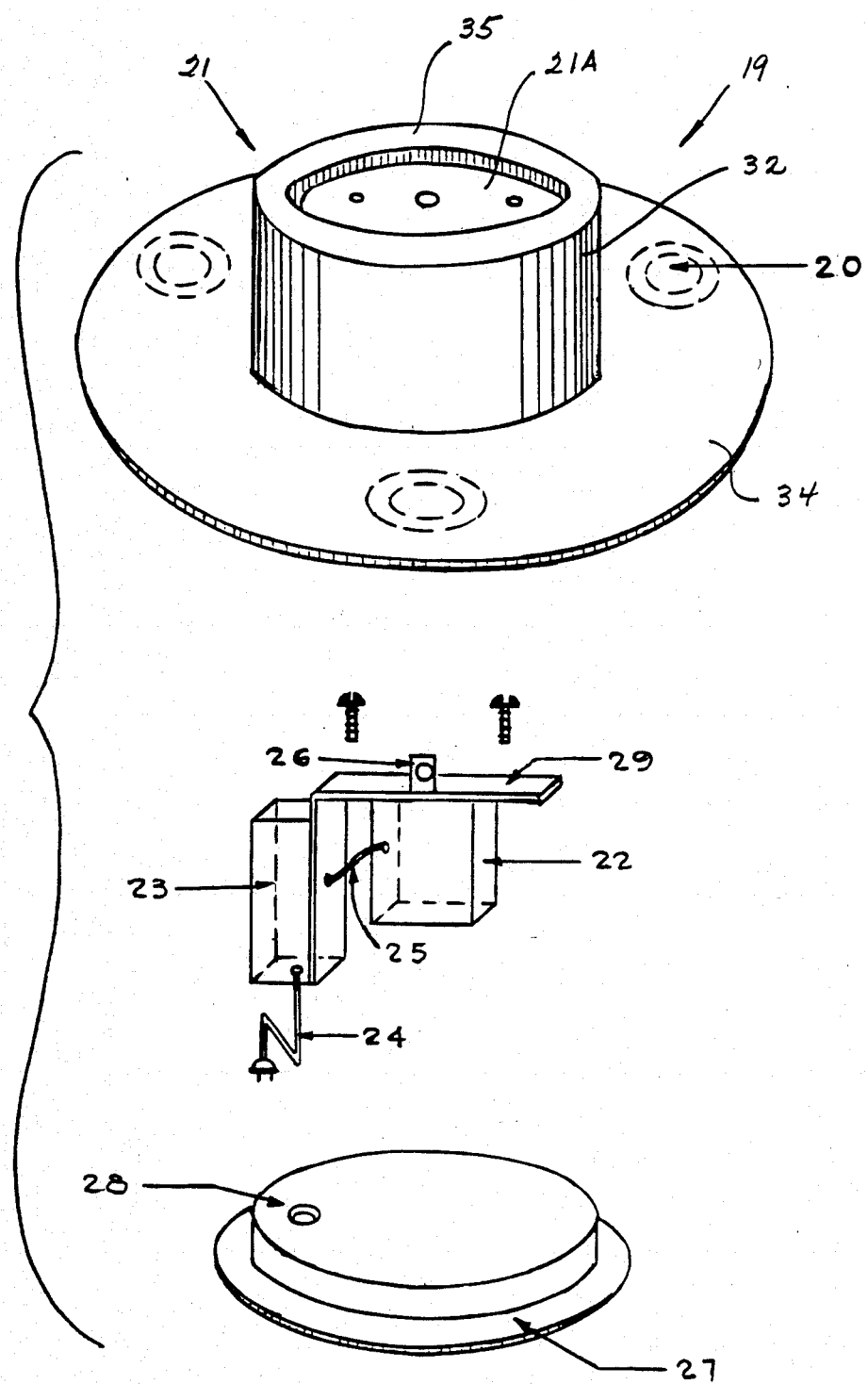
FIG. 4 is an exploded perspective view of another portion of the pet feeding device of FIG. 1 showing the base unit, timer/motor mechanism and base closure.

As shown in FIG. 1, the automatic pet feed device generally denoted as the numeral 8, is a self contained modular unit. This device sequences every 12 hours under control of the timer/motor mechanism 22, 23 as depicted in FIGS. 2, 3, and 4. This modular feeding device 8 consists of a lid 10 with feed opening 11, food tray 12 with a plurality of individual food compartments 15 separated by partitions 16, and a base unit 19. This lid 10 fits over the food tray 12 and snugly on the base unit 19, and can be easily removed without the use of tools. The food tray 12 is generally in the shape of a truncated cone with a perimeter skirt 30 depending from the periphery of the base. The food compartments 15 are formed in the slanted wall 31 of the cone shaped food tray 12, open to the slanted wall 31, and equally spaced apart circumferentially of the cone shaped food tray 12. The food compartments 15 depend from the slanted wall 31 and the bottom of the compartments are generally in the plane of the peripheral edge of the perimeter skirt 30. The truncated top 14 of the food tray 12 includes means 13 for engaging a drive lug 17 operatively associated with the driven shaft 26 of the motor 22. The drive lug engagement means 13 is shown best in FIGS. 2 and 3 as a downwardly open pocket having a rectangular peripheral shape located at the geometric center of the truncated top 14 of the food tray 12. The drive lug 17 is also rectangular in peripheral shape and is sized to nest in registration within the pocket 13 with a slide fit. The food tray rests on top of the drive lug 17 which is attached to the motor driven shaft 26 and is held in place by set screw 18. The base unit 19 consists of a central module support 21 having cylindrical side wall 32, a closed top 21A integral with the cylindrical slide wall, and an open bottom 33 defining an enclosure for the timer/motor mechanism 22, 23. A circumferential flange 34 is integral with the side wall 32 and projects radially outwardly from the circumferential edge of the cylindrical side wall 33 defining the open bottom 33 of the central module support 21. The closed top 21A further includes an annular bearing 35 concentric with the top 21A and raised above the top 21A. As shown, the annular bearing 35 is integrally formed with the closed top 21A. The food tray 12 rides on and is supported by the annular bearing 35 of the module support 21. More particularly, the underside of the truncated top 14 of the food tray 12 rests on the annular bearing 15. In addition, the vertical distance from the circumferential flange 34 of the base unit 19 to the bearing surface of the annular bearing 35 is greater than the vertical distance from the peripheral edge of the perimeter skirt 30 to the underside of the truncated to 14 of the food tray 12 so that the peripheral edge of the perimeter skirt 30 is spaced from the circumferential flange 34 of the base unit 19. The top 21A of the base module 21 contains a hole at the center of the top 21A for receiving the motor shaft 26 and mounting holes for the timer/motor mounting bracket 29. The food tray 12 is driven directly by the motor via the engagement of the drive lug 17 in the pocket 13 in the top 14 of the food tray 12 and requires no belts, pulleys, or gears for coupling purposes. The base unit 19 rests on support feet 20 formed in the circumferential flange 34, providing support for the food tray unit. The drive lug 17 motor shaft arrangement provides a superior approach to powering the food tray since it is a direct drive method and requires no gears for speed reduction or belts that can slip with age or stretch in time. In addition, this method provides accuracy and repeatability so that a compartment pair is precisely under the lid opening at all times.

The timer/motor mechanisms 22, 23 are contained on a mounting bracket 29 which fits inside the central module support 21 of base unit 19 as shown in FIG. 2. A base closure 27 fits underneath the base unit 19 over the bottom opening 33 of the central module support 21 and includes an opening 28 for the power cord 24. The base closure 27 is cemented to the bottom of the base unit 19 and thus seals the entire timer/motor mechanisms 22, 23 inside the central module support 21 preventing access by the pet or pet owner.

With reference to FIGS. 1, 2 and 3, the lid 10 is also in the shape of a truncated cone with a perimeter skirt 36 depending from the periphery of the base of the cone. The circumference of the skirt 36 of the lid 10 is larger than the circumference of the skirt 30 of the food tray 12, and the slope of the slanted wall 37 of the lid 10 is essentially the same as the slope of the slanted wall 31 of the food tray 12. The feed opening 11 is formed in the slanted wall 31 of the lid 10 and is sized and configured to expose two adjacent food compartments 15. The lid 10 fits coaxially over the base unit 19 with the peripheral edge of the perimeter skirt 36 of the lid 10 registering with and supported on the circumferential flange 34 of the base unit 19. The perimeter skirt 36 of the lid 10 circumferentially and concentrically overlaps the perimeter skirt 30 of the food tray 12, and the slanted wall 37 of the lid 10 is generally parallel to and spaced a small distance from the slanted wall 31 of the food tray 12. In addition, the truncated to of the lid 10 is spaced from and parallel to the truncated top 14 of the food tray 12.

Figure 5:
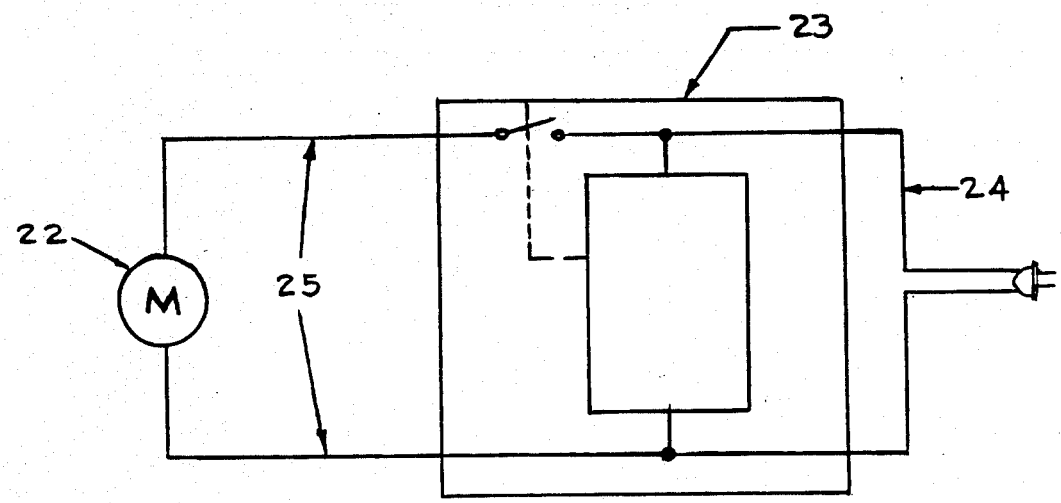
FIG. 5 is a schematic representation of the electrical control system consisting of the timer/motor module and their interconnection.

As depicted in FIGS. 4 and 5, the drive mechanism consists of two standard components; an AC motor 22 and a pulsed timer unit 23. FIG. 5 shows the electrical schematic diagram of the control circuit. The AC drive motor turns at a rate of one RPM. The AC drive motor 22 is pulsed every twelve hours by the timer unit 23. The timer unit 23 pulses on the AC drive motor for exactly ten seconds. The motor then turns exactly 60 degrees and stops. The AC motor output shaft 26 is coupled to the food tray via drive lug 17. The timer 23 is powered by a standard household 110 VAC source via a power cord 24 and provides AC power to the AC motor by closing an internal set of contracts and applying electrical energy via the pair of control wires 25. The number of food and water compartments, and the timer/motor relationship thus eliminates the need for belts, pulleys, gear reduction to accomplish indexing.

The preferred embodiment has been described and illustrated in detail herein. This invention may be modified, altered, or adapted by those skilled in the art either by increasing or decreasing the number of or volume of the food and water pairs, and the relationship to the timer/motor operation. However, those variations are to be understood to be within the scope and spirit of this invention and the following claims.

What is claimed is:

1. An automatic pet feeding device comprising:
   a stationary base unit defining a central enclosure having a closed to;
   a motor/timer mechanism located within the enclosure with the driven shaft of the motor projecting upwardly and outwardly of the enclosure through a central hole in the top of the base unit;
   a stationary annular bearing concentric and unitary with the closed top, and spaced radially from the central hole formed therethrough, of the base unit and raised above the closed top;
   a food tray having a plurality of food compartments circumferentially spaced apart about the perimeter of the food tray, the food tray being supported and rides solely on the annular bearing of the base unit for rotation thereon relative to the base unit;
   means associated with the food tray for engaging the portion of the driven shaft of the motor projecting through the center hole of the closed top of the base unit for engaging the driven shaft of the motor so that the food tray rotates with the driven shaft of the motor on the annular bearing relative to the stationary base unit; and a removable lid covering the food tray and supported on the base unit, the lid having a feed opening therethrough sized and configured to expose two adjacent food compartments of the food tray therebeneath.

2. The automatic pet feed device of claim 1, wherein the base unit comprises:
 a central module support having a perimeter side wall, a closed to, and an open bottom defining the central closure;
 a base closure closing the open bottom of the central module support to seal the motor/timer mechanism within the central enclosure; and
 a circumferential flange projecting radially outwardly from the circumferential edge of the side wall of the central module support at the open bottom of the central module support, the lid being supported on the circumferential flange.

3. The automatic pet feeding device of claim 1 wherein:
 the driven shaft engagement means comprises a downwardly open pocket formed in the food tray at the geometric center thereof; and,
 a drive lug attached to the projecting end of the motor driven shaft for rotation with the driven shaft and having a peripheral configuration and sized to nest in registration within the pocket in the food tray with a sliding fit.

4. The automatic pet feeding device of claim 1, wherein the timer pulses the motor at predetermined time intervals to index the food tray through a predetermined arc of revolution sufficient to move successive adjacent feed compartments into registration with the feed opening for predetermined periods of time.

5. An automatic pet feeding device comprising:
 a base unit comprising a central module support having a side wall, a closed top, and an open bottom defining a central enclosure;
 a motor/timer mechanism located within the enclosure with the driven shaft of the motor projecting upwardly and outwardly of the enclosure;
 a food tray having a plurality of food compartments circumferentially spaced apart about the perimeter of the food tray, the food tray being supported on the central enclosure of the base unit;
 means associated with the food tray for engaging the driven shaft of the motor so the food tray rotates with the driven shaft of the motor;
 a removable lid covering the food tray and supported on the base unit, the lid having a feed opening therethrough sized and configured to expose two adjacent food compartments of the food tray therebeneath;
 a base closure closing the open bottom of the central module support to seal the motor/timer mechanism within the central enclosure;
 a circumferential flange projecting radially outwardly from the circumferential edge of the side wall of the central module support at the open bottom of the central module support, the lid being supported on the circumferential flange;
 a stationary annular bearing concentric with the closed top of the central module support and raised above the closed to, and the food tray rides on and is supported by the annular bearing;
 the food tray is generally in the shape of a truncated cone with a perimeter skirt depending from the periphery of the base of the truncated cone;
 the food compartments are formed in the slanted wall of the cone shaped food tray and equally spaced apart circumferentially of the tray; and
 the truncated top the food tray is the only part of the tray in contact with the annular bearing so that the peripheral edge of the perimeter skirt of the food tray is spaced above the circumferential flange of the base unit.

6. The automatic pet feeding device of claim 5, wherein the driven shaft engagement means is located at the geometric center of the truncated top of the food tray.

7. The automatic pet feeding device of claim 5, wherein the lid is generally in the shape of a truncated cone with a perimeter skirt depending from the periphery of the base of the truncated cone, the circumference of the skirt of the lid being larger than the circumference of the skirt of the food tray, the slope of the slanted wall of the lid being substantially the same as the slope of the slanted wall of the food tray, and the feed opening is formed in the slanted wall of the lid.

8. The automatic pet feeding device of claim 7 wherein:
 the lid fits coaxially over the base unit with the peripheral edge of the perimeter skirt of the lid registering with and supported on the circumferential flange of the base unit;
 the perimeter skirt of the lid circumferentially and concentrically overlies the perimeter skirt of the food tray; and,
 the slanted wall of the lid is substantially parallel to and spaced a small distance from the slanted wall of the food tray.

9. The automatic pet feeding device of claim 8 wherein the truncated top of the lid is spaced from and parallel to the truncated top of the food tray.

* * * * *

UNITED STATES PATENT AND TRADEMARK OFFICE
CERTIFICATE OF CORRECTION

PATENT NO. : 4,805,560

DATED : February 21, 1989

INVENTOR(S) : Knego, et al

It is certified that error appears in the above-identified patent and that said Letters Patent is hereby corrected as shown below:

Col. 1, line 26, delete "fried" and insert -- friend --

Col. 4, line 17, delete "to" and insert -- top --

Col. 4, line 48, claim 1, delete "to" and insert -- top --

Col. 5, line 9, claim 2, delete "to" and insert -- top --

Col. 6, line 13, claim 5, delete "to" and insert -- top --

Col. 6, line 21, claim 5, after "top" insert -- of --.

Signed and Sealed this

Fourteenth Day of November, 1989

*Attest:*

JEFFREY M. SAMUELS

*Attesting Officer*   *Acting Commissioner of Patents and Trademarks*